(12) United States Patent
Smith et al.

(10) Patent No.: US 10,373,245 B1
(45) Date of Patent: Aug. 6, 2019

(54) ON-LINE BILLING RELATED TRANSACTIONS IN AN INTEGRATED HEALTH PLAN SYSTEM

(75) Inventors: David Smith, Coppell, TX (US); Jeffrey Cohen, Higganum, CT (US)

(73) Assignee: Cognizant TriZetto Software Group, Inc., Englewood, CO (US)

( * ) Notice: Subject to any disclaimer, the term of this patent is extended or adjusted under 35 U.S.C. 154(b) by 3044 days.

(21) Appl. No.: 10/909,799

(22) Filed: Jul. 30, 2004

(51) Int. Cl.
 *G06Q 40/00* (2012.01)
(52) U.S. Cl.
 CPC ................................. *G06Q 40/00* (2013.01)
(58) Field of Classification Search
 USPC ................................. 705/34, 1–4; 709/206
 See application file for complete search history.

(56) References Cited

U.S. PATENT DOCUMENTS

| | | | |
|---|---|---|---|
| 4,667,292 A | | 5/1987 | Mohlenbrock et al. |
| 5,070,452 A | | 12/1991 | Doyle, Jr. et al. |
| 5,253,164 A | | 10/1993 | Holloway et al. |
| 5,301,105 A | | 4/1994 | Cummings, Jr. |
| 6,044,362 A | * | 3/2000 | Neely .............................. 705/34 |
| 6,092,047 A | | 7/2000 | Hyman et al. |
| 6,343,271 B1 | * | 1/2002 | Peterson ................ G06Q 40/02 705/4 |
| 6,745,229 B1 | * | 6/2004 | Gobin ................ G06F 11/0709 709/206 |
| 2002/0049617 A1 | | 4/2002 | Lencki et al. |
| 2002/0065686 A1 | * | 5/2002 | Monteleone et al. ............ 705/3 |
| 2002/0087444 A1 | | 7/2002 | DiPiero et al. |
| 2003/0009355 A1 | | 1/2003 | Gupta |
| 2003/0212566 A1 | * | 11/2003 | Fergusson ............ G06Q 30/018 705/317 |

FOREIGN PATENT DOCUMENTS

WO    WO 01/27719    4/2001

OTHER PUBLICATIONS

PCT International Search Report and Written Opinion of the International Searching Authority, International Application No. PCT/US05/05433, Jul. 11, 2006.

* cited by examiner

*Primary Examiner* — Joseph D Burgess
(74) *Attorney, Agent, or Firm* — Dawn-Marie Bey; Bey & Cotropia PLLC

(57) ABSTRACT

Disclosed is an integrated health plan computer system that enables on-line billing related transactions. The integrated health plan computer system may include a server to couple the integrated health plan computer system to a billing entity user through a network. A billing module operable with the integrated health plan computer system and the server is utilized to enable on-line billing related transactions for the billing entity user through the network. The billing module includes an invoice presentment module to perform invoice presentment transactions for the billing entity user and to display results of the invoice presentment transaction to the billing entity user. The billing entity user may be a group administrator, a broker, or an individual.

18 Claims, 9 Drawing Sheets

ON-LINE BILLING RELATED TRANSACTIONS IN AN INTEGRATED HEALTH PLAN SYSTEM

BACKGROUND

1. Field of the Invention

Embodiments of the invention relate to the field of network-based processing systems, and more particularly, to on-line billing related transactions utilizing an integrated health plan system.

2. Description of Related Art

The escalating cost of health care has been forcing health plans to create innovative ways to reduce costs. One way in which this has been accomplished is by utilizing computer systems and networking technologies to allow cost-effective sharing of, and access to, medical and insurance information. Integrated health plan systems that are network accessible have been developed to allow more convenient means for subscribers, members, group administrators, and insurance brokers and agents to perform some limited on-line services in a more cost-effective manner. However, existing integrated health plan systems have a number of drawbacks including limited network accessibility, limited display of information, and limited functionality.

Particularly, existing integrated health plan systems that include functionality related to on-line services have a number of drawbacks including, among others, lack of configurability, lack of self-service, lack of user billing entity specific transactions, and lack of standardized display and entry format in relation to billing related transactions. The lack of these features causes errors, delay, and frustration to the user.

For example, as to particular billing related transactions, bill presentment and payment processing both represent one of the most challenging administrative business processes facing health payer organizations. Payers spend exhaustive man-hours sorting through the process of invoice correction, processing, payment reconciliation, and application of premiums. Unlike many other payment processes, health care premium reconciliation presents a real-time, often retrospective processing challenge.

In general, billing related transactions in the health care field are presently wrought with inefficiencies. Although previous attempts have been made to improve billing related transactions, particular to the health care field, these attempts have generally resulted in customer service irritations and even more lengthy processing cycles.

DESCRIPTION OF THE INVENTION

Figure 1:
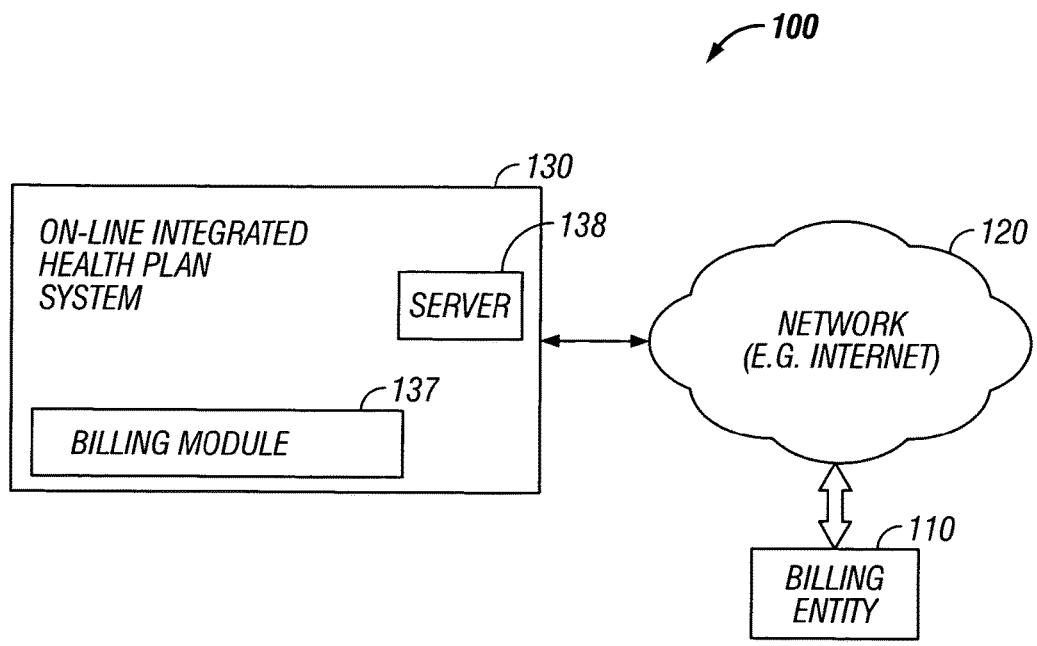
FIG. 1 is a block diagram illustrating a system in which one embodiment of the invention may be practiced.

As will be described, embodiments of the invention provide billing entity users with an easy web-based method of performing billing related transactions, such as performing billing information updates in relation to a health plan, thereby improving customer satisfaction and reducing costs. In particular, group administrators, employers, brokers, agents, and individuals are allowed to view and update invoices, eligibility information, make benefit maintenance changes, and view and update other billing related information. This can all be accomplished on-line via a computer network, such as the Internet. In this way, administrative costs are reduced by reducing paper-based transactions and easing the customer-service burden.

More particularly, embodiments of the invention, as will be discussed hereinafter, allow group administrators, brokers/agents, and individuals to access and update billing information by invoice, contract, and down to subscriber level detail. Further, group administrators, brokers/agents, and individuals can view and make on-line payments and invoice corrections. This is especially useful for health insurance payers, of all sizes, who want fast and accurate access to billing, invoice, payment, and contract information. Individuals may have similar access to billing information and functions allowing them to view their invoices for their privately held policies on-line. In addition, embodiments of the invention relate to a software-based billing module that may be easily integrated with existing on-line health plan systems.

As will be discussed, these techniques may be embodied in a software-based billing module that helps to accelerate billing related transactions, as well as the viewing, updating, and utilization of billing related data. The billing software module may be a Web-based application that streamlines the billing process by allowing group administrators, individuals (e.g. subscribers and members), and brokers/agents associated with a health plan, to perform self-service billing related transactions, including viewing and updating billing related information, and other services, on-line.

In one aspect, embodiments of the invention relate to an integrated health plan computer system that enables on-line billing related transactions. The integrated health plan computer system may include a server to couple the integrated health plan computer system to a billing entity user through a network. A billing module operable with the integrated health plan computer system and the server is utilized to enable on-line billing related transactions for the billing entity user through the network. The billing module includes an invoice presentment module to perform invoice presentment transactions for the billing entity user and to display results of the invoice presentment transaction to the billing entity user. The billing entity user may be a group administrator, a broker, or an individual.

For example, an invoice presentment transaction may include performing a current invoice search for a billing entity user and displaying results of the current invoice search to the billing entity user. An invoice presentment transaction may also include performing an invoice search based upon input dates and displaying results of the invoice search as an invoice search listing to the billing entity user. An invoice detail for a desired invoice of the invoice search listing may be selected based upon the selection of an invoice ID for the desired invoice from the invoice search listing and the invoice detail for the desired invoice will then be displayed to the billing entity user. The billing module may further include a prospective subscriber roster module to perform subscriber roster transactions and to display prospective subscriber roster results to a billing entity user. The billing module may further include a processing and payment transaction module to provide billing address information for a selected individual, group, or subgroup or for such functions as producing a payment receipt history.

In the following description, numerous specific details are set forth. However, it is understood that embodiments of the invention may be practiced without these specific details. In other instances, well-known circuits, structures, software modules, processes, networking devices, and techniques have not been shown in order not to obscure the understanding of this description.

Elements of particular embodiments of the invention may be implemented by hardware, software, firmware, microcode, or any combination thereof. When implemented in software, firmware, or microcode, the elements of the embodiment of the present invention are the program code, code segments, and instructions to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information.

Examples of the machine accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operation described in the following. The term "data" here refers to any type of information that is encoded for machine-readable purposes. Therefore, it may include programs, instruction, code, data, files, etc.

All or part of an embodiment of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

It is noted that an embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

FIG. 1 is a diagram illustrating a system 100 in which one embodiment of the invention may be practiced. The system 100 includes a billing entity user 110, a network 120, and an on-line integrated health plan system 130, including a billing module 137.

The billing entity user 110 is any entity, constituent, or person who may use the integrated health plan system 130. Particularly, the billing entity user 110 may be an actor who performs an action when using the system 130. For example, the billing entity user 110 may be a payer for a health plan such as an employer, a group administrator, a broker/agent, or an individual (e.g. a subscriber or member). The billing entity user 110 typically connects to the network 120 to access a Web-based framework that provides for health plan billing related transactions and other services.

The network 120 is any network that provides remote access to the integrated health plan system 130. It may be the Internet, an intranet, an extranet, a local area network (LAN), a wide area network (WAN), a wireless network, a wireless fidelity (Wi-Fi) network, a mobile network, or any other networks. The network 120 may use any suitable protocol, such as Transmission Control Protocol/Internet Protocol (TCP/IP), Asynchronous Transfer Mode (ATM), Frame Relay (FR), Point-to-point Protocol (PPP), Systems Network Architecture (SAN), Voice over Internet Protocol (VoIP), or any other protocol, and any combination thereof.

The integrated health plan system 130 provides functionalities to support health plan insurance tasks. The typical functions include the enrollment and management of members and/or employers, accounting, claim processing to determine allowance or denial of claims, and providing payments to providers and members. Also, the system 130 may include defined contribution plans or accounts such as a Health Reimbursement Accounts (HRAs) and Flexible Spending Accounts (FSAs) (not shown).

Particularly, the integrated health plan system 130 also includes a billing module 137 that provides billing support and functionalities to billing entity users, as will be hereinafter discussed. In one embodiment, the billing module 137 may be a software-based module.

The on-line health plan system 130 may include servers having software modules for transmitting and receiving data to and from a computing device used by the billing entity user 110 over the network 120. For example, using the Hypertext Transfer Protocol (HTTP), Hypertext Markup Language (HTML), or Extensible Markup Language (XML), server 138 of the system 130 can communicate with various users, such as the billing entity user 110, across the network 120 to provide various functions and data to billing entity user 110.

The billing entity user 110 may utilize an embedded browser which is part of an application software module or typical browser such as Netscape®, Internet Explorer®, etc. to supply data to and/or to access data from the on-line health plan system 130. In one embodiment, the system 130 and billing module 137, may be compatible with the FACETS® line of software products created by TriZetto® Group, Inc.

The billing module 137 provides features for on-line billing related transactions and other services delivered by the integrated health plan billing system 130 to the billing entity user 110. The billing module 137 may be a separate module or integrated into the system 130.

The integrated health plan system 130 and/or the billing module 137 may be implemented in a computing device. They may be stored on a system memory for execution or on a mass storage device. The mass storage device may include compact disk (CD) read only memory (ROM), flash memory, a digital video/versatile disc (DVD), floppy diskette, and hard disk, and any other magnetic or optic storage devices. The mass storage device provides a mechanism to read machine-readable media. The machine-readable media or the article of manufacture may contain computer readable program code or data that, when accessed by the computing device or a machine, causes the machine to implement instructions and perform operations or tasks as described in the following.

Figure 2:
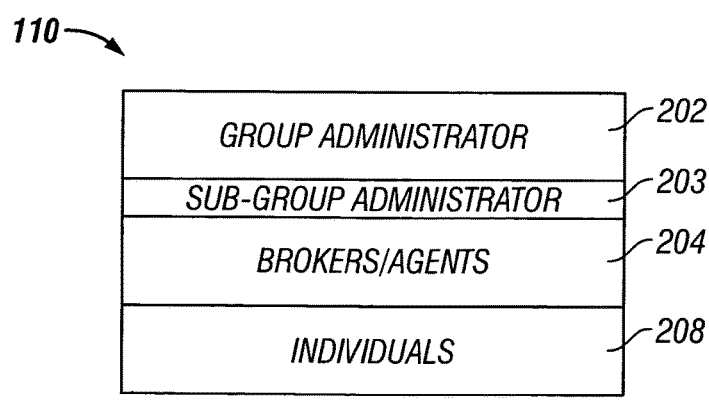
FIG. 2 is a block diagram showing examples of types of billing entity users, according to one embodiment of the invention.

Turning briefly to FIG. 2, FIG. 2 is a block diagram showing examples of types of billing entity users 110. For example, a billing entity user 110 may be: a group administrator 202, a sub-group administrator, a broker/agent 204, or an individual 208.

For example, a group administrator or sub-group administrator could be an administrator associated with a health insurance payer organization (e.g. BLUE CROSS/BLUE SHIELD, AETNA, etc.) that represents an employer or a group of employers or individual members or could be an administrator from a corporation or a group of corporations to directly represent these members.

Further, as will be discussed, individuals, such as individual subscribers and members of a health plan may also utilize embodiments of the invention related to on-line billing related transactions. Brokers/agents 204 typically do not have a billing entity level associated with them, but are nonetheless enabled with access to billing related transactions of the on-line integrated health plan system through permission levels.

A group (e.g. managed by a group administrator 202) may be defined as a logical collection of subscribers linked together for the purpose of treating them as a single unit. For example, a group can be all the employees of a company, a collection of employers, a union or any other set of individuals who share the same coverage. A subgroup is a logical subset of a group. For example, a subgroup may be actively employed members of a group, retired members of the same group. Or, for example, in a multi-site company, subgroups may be defined by a physical location. An individual (e.g. a subscriber or member) 208 may also be considered a billing entity 110. Typically, this occurs if a user has a private coverage policy obtained through a health payer or if the user is a terminated employee who is maintaining their coverage through a COBRA.

Figure 3:
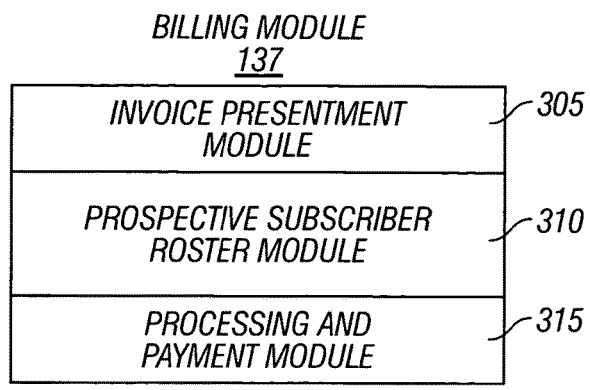
FIG. 3 is a block diagram illustrating particular software modules that may be utilized as part of the billing software module, according to one embodiment of the invention.

Turning briefly to FIG. 3, FIG. 3 is a block diagram illustrating particular software modules that may be utilized as part of the billing software module 137, according to one embodiment of the invention. As shown in FIG. 3, the billing software module 137 may include an invoice presentment software module 305, a prospective subscriber roster software module 310, and a processing and payment software module 315. The details of the functionality performed by each of these modules, as part of the overall billing module 137, will be discussed hereinafter.

Figure 4:
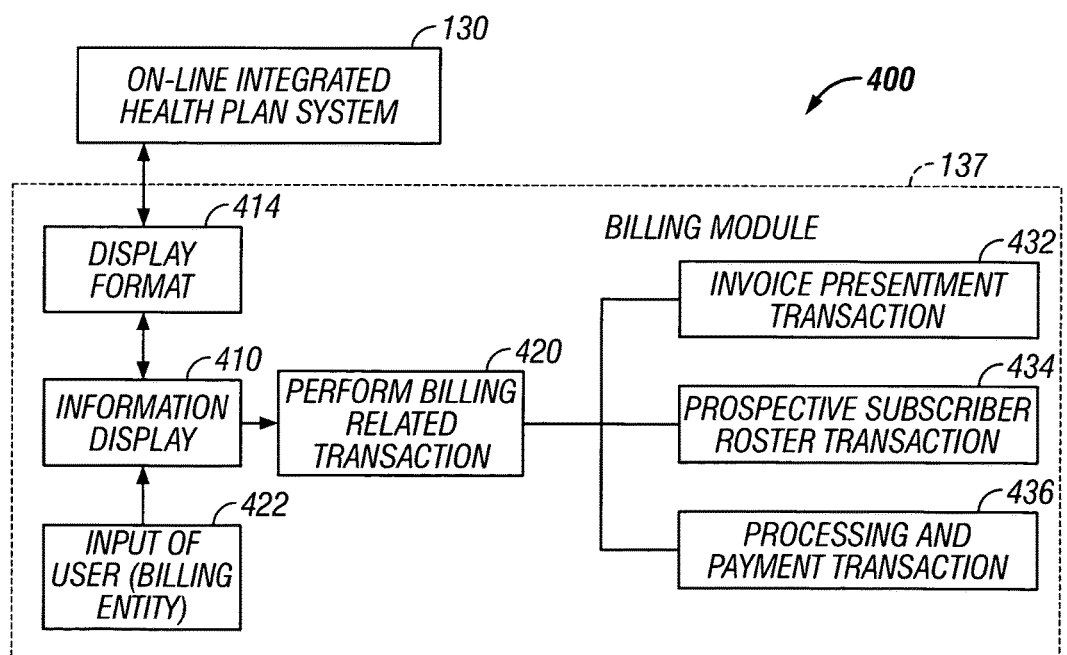
FIG. 4 is a block diagram illustrating a more detailed example of the billing module integrated with the on-line integrated health plan system, according to one embodiment of the invention.

With reference now to FIG. 4, FIG. 4 is a block diagram illustrating a more detailed example of the billing module 137 integrated with the on-line integrated health plan system 130, according to one embodiment of the invention. The billing module 137 further includes an information display module 410 to display billing related information and a transaction module 420 to perform billing related transactions.

The information display module 410 displays information to a billing entity user, in response to an input entry 422 by a billing entity user. The information complies with a display format 414 that is compatible with the on-line integrated health plan system 130. The input 422 may be a secure entry, for example, by the use of a specific login name with password protection.

The transaction module 420 performs a transaction related to input 422 of a billing entity user. The input 422 may include information or data entered by billing entity user or may include a selection of an icon, a button, a link, a pull-down menu or a soft-key, etc., by the billing entity user. The input 422 is typically configured to be compatible with the on-line integrated health plan system 130 and the other components of the billing module 137.

The transaction module 420 performs an invoice presentment transaction 432 by implementing the invoice presentment software module, a prospective subscriber roster transaction 434 by implementing the prospective subscriber roster software module, and a processing and payment transaction 436 by implementing the processing and payment software.

It should be appreciated that the previously-described modules of the billing module 137 are but just one example of a configuration of software modules, which may be utilized to implement billing related functionality, as will be hereinafter discussed, and that many other configurations are possible.

Briefly, the invoice presentment transaction 432 relates to the presentment of invoices. As invoices are produced, group administrators, brokers/agents, individuals (e.g. subscribers or members), can search for and view invoices on-line. Typically, the invoices include current, historical, and re-bill invoices (i.e. invoices previously generated as well as current invoices for the current billing period). For example, the invoice presentment transaction 432 allows a billing entity user to view and update their current invoice, premium payment, invoice listings and to perform invoice searches.

The prospective transcriber roster transaction 434 allows a billing entity user to view and update a subscriber roster for a specified "as of" date at the respective billing entity level. The processing and payment transaction 436 allows a billing entity user to view and update billing address information for a group or subgroups, dependent upon billing entity level, and to view and update receipt history. Moreover, it should be appreciated that the billing module 137 also provides additional functionality, as will be discussed hereinafter.

Figure 5:
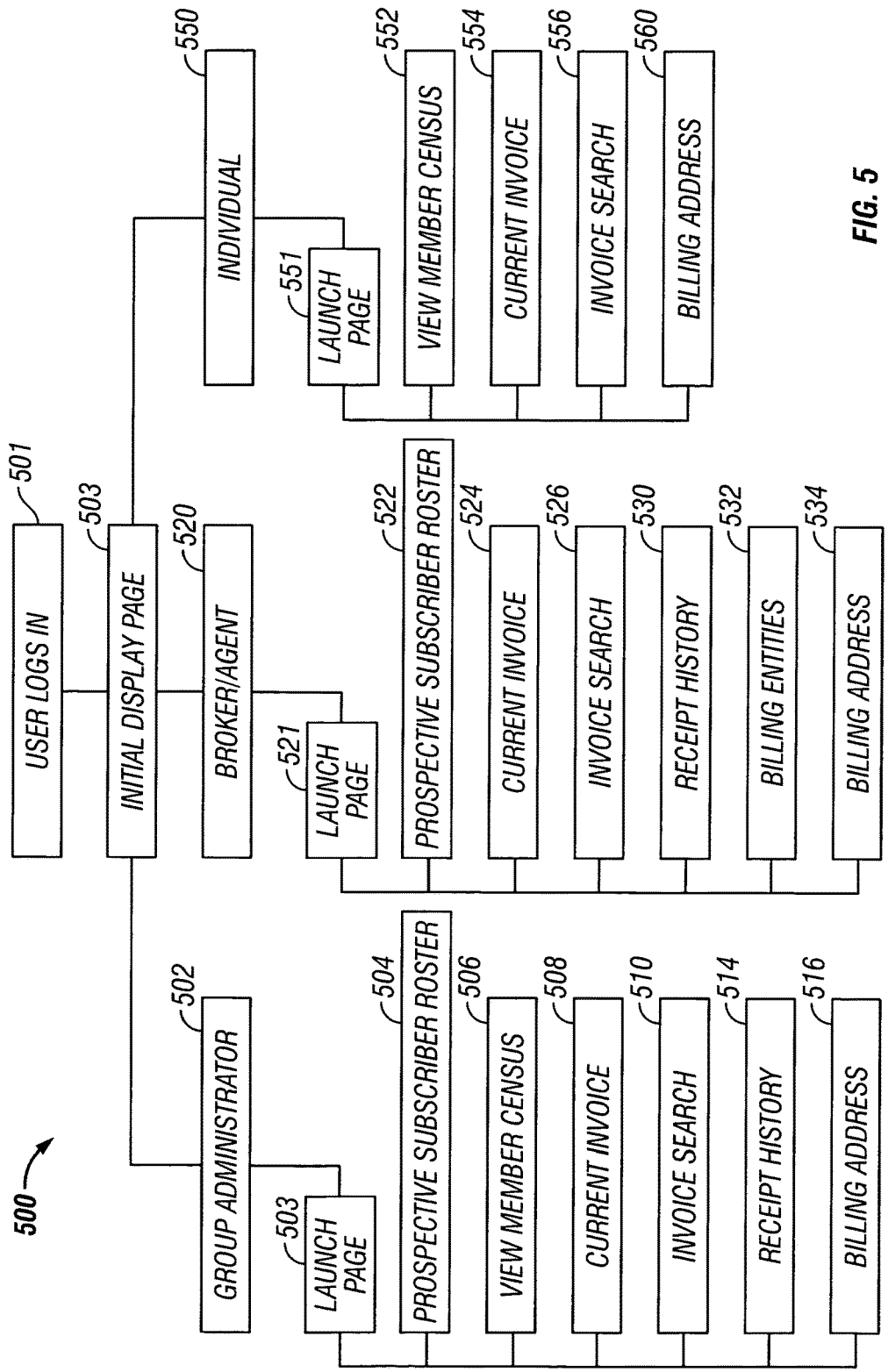
FIG. 5 is a block diagram illustrating a general overview of the functions performed by the previously-discussed billing module, according to one embodiment of the invention.

Turning now to FIG. 5, FIG. 5 is a block diagram illustrating a general overview of the functions 500 performed by the previously-discussed billing module, according to one embodiment of the invention. At block 501 a billing entity user logs in. This can be accomplished, for example, by the input of a recognized log-in and/or password, as previously discussed, such that the billing entity user logs on to a billing related transaction section of the on-line integrated health plan system 130.

An initial display page 503 is then presented to the billing entity user. The initial display page 503 allows the billing entity user to select whether it is acting as a group administrator 502, a broker/agent 520, or an individual (e.g. subscriber or member) and allows or disallows the selection based upon the privilege level afforded the billing entity user by the system.

Dependent upon the billing entity selection, a respective launch page 503, 521, or 551 is then respectively displayed. For example, if the billing entity user selects group administrator 502 as its billing entity level, then a launch page 503 is displayed to the billing entity user that is populated with a grouping of selectable billing related transactions for the group administrator. These selectable billing transaction selections include prospective subscriber roster 504, view member census 506, current invoice 508, invoice search 510, receipt history 514, and billing address 516.

Similarly, if the billing entity user selects broker/agent 520 as its billing entity level, then a launch page 521 is displayed to the billing entity user that is populated with a grouping of selectable billing related transactions appropriate for the broker/agent. These selectable billing related transactions include prospective subscriber roster 522, current invoice 524, invoice search 526, receipt history 530, billing entities 532, and billing address 534.

If the user billing entity selects individual 550 as its billing entity level, then a launch page 551 is displayed to the billing entity user that is populated with a grouping of selectable billing related transactions appropriate for the individual. These selectable billing related transactions include view member census 552, current invoice 554, invoice search 556, and billing address 560.

The previously-described billing module 137 provides appropriate display formats and input formats (e.g. utilizing display format module 414 and information display module 410) to the billing entity user and based upon the input of the billing entity user, the billing module 137 performs billing related transactions to implement the previously-identified selectable billing related transactions, each of which will be hereinafter discussed in detail. For example, the selection of billing related transactions in FIG. 5, and in the remaining Figures, may be accomplished by billing entity user selections (e.g. double-clicking with an input device (e.g. a mouse) or via the use of a keypad) of corresponding buttons, hyper-links, or selections from a drop-down menu.

Figure 6:
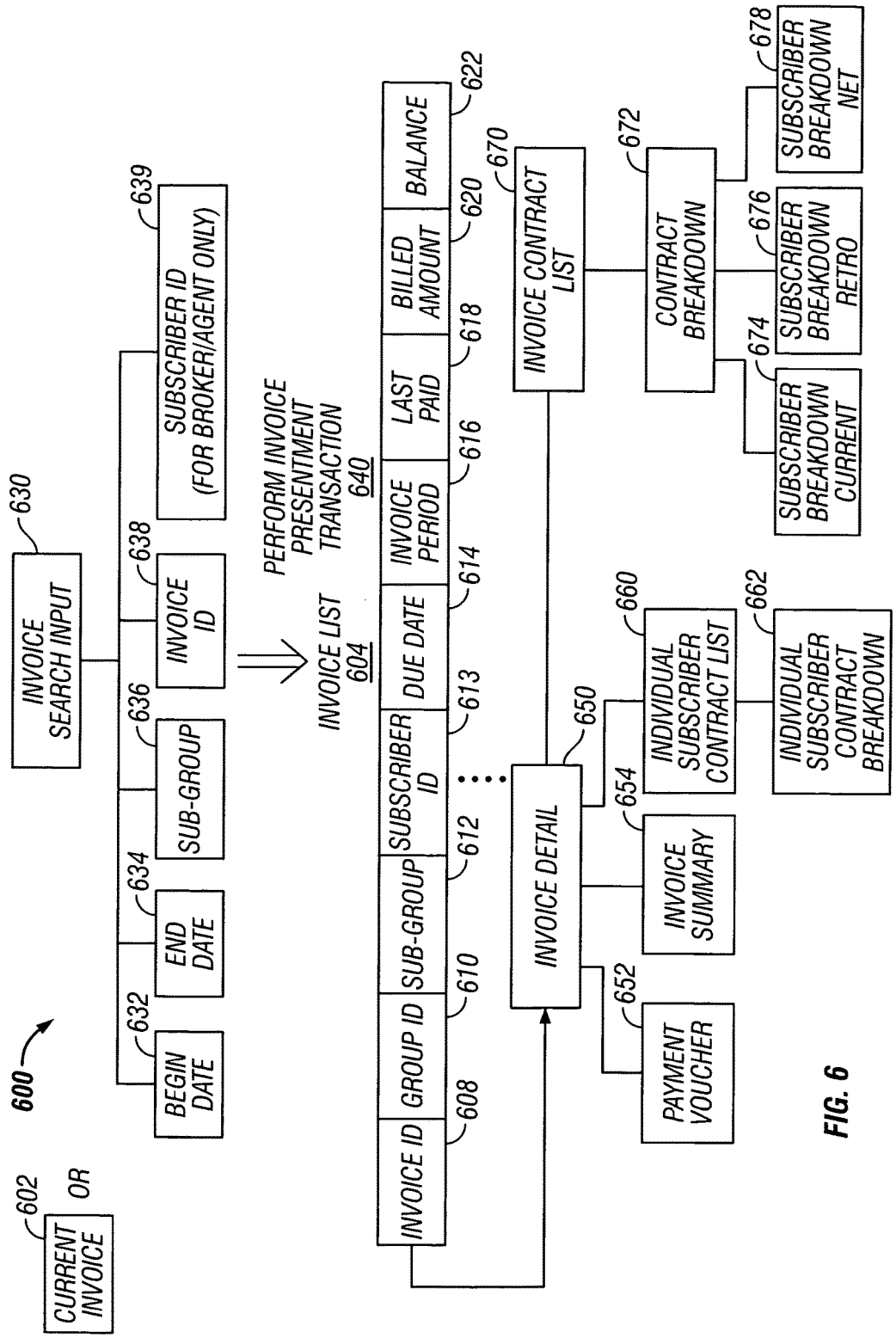
FIG. 6 is a block diagram illustrating invoice presentment functionality, according to one embodiment of the invention.

With reference to FIG. 6, FIG. 6 is a block diagram illustrating invoice presentment functionality 600, according to one embodiment of the invention. As shown in FIG. 6, if a user billing entity (e.g. group administrator, broker/agent, or individual) selects current invoice billing related transaction 602 then the billing module performs a presentment invoice transaction 640 and as a result an invoice list 604 is presented to the user billing entity.

The invoice list 604 typically includes a list of the current invoices from six months back to the current date. Typically a plurality of invoice listings is presented. Each invoice listing 604 typically includes one or more of the following: an invoice ID 608, a group ID 610, a subgroup ID 612, a subscriber ID 613, a due date 614, an invoice period 616, a last paid amount 618, a billed amount 620, and a balance 622. The current invoice listing may also include re-bills. The group ID 610, subgroup ID, and subscriber ID 613 are displayed based upon the respective billing entity level of the billing entity user (e.g. individual/subscriber or broker/agent, subgroup administrator, group administrator).

Alternatively, a billing entity user (group administrator, broker/agent, individual) may instead choose to perform an invoice search 630. The invoice search input 630 typically requires a billing entity user to input one or more of the following: a begin date 632, an end date 634, a subgroup 636, or an invoice ID 638. Further, for broker/agents a subscriber ID 639 may also be required. Further, the subgroup field only appears when the billing entity is a subgroup itself or a group administrator is operating at the subgroup level.

Based upon the invoice search input 630, the billing module performs a presentment invoice transaction 640 and an invoice list 604 having a plurality of invoice listings is presented. Again, each invoice listing typically includes one or more of the following: an invoice ID 608, a group ID 610, a subgroup ID 612, a subscriber ID 613, a due date 614, an invoice period 616, a last paid field 618, a billed amount 620, and a balance 622. Again, subscriber ID 613 is only applicable for brokers/agents as billing entities. Further, the subgroup ID is only applicable when invoices are being searched for at the subgroup level.

Accordingly, the billing module displays an invoice list to the billing entity user and allows the billing entity user to perform invoice searches in order to view their premium and payment history as well as to perform updates.

It should be appreciated that prior to viewing the invoice list 604, filter processing is typically implemented, as invoice volumes may be considerable. A filter may be configured in terms of elements, business rules, rule dependencies, and role/actor definition. For example, a group may have drill-down on subgroups, but a subgroup will not have drill-down because they are only able to access their individual level.

A billing entity user may search for invoices by one or more of the following: begin date, end date, by a specific subgroup by selecting a subgroup from a list of subgroups associated with the group logged in via subgroup selector 636, or by invoice ID 608. Additionally, invoice searching is provided that allows the billing entity user to utilize a find function to search for certain displayed results in the invoice listing screen 604.

Thus, using the above-described input criteria, invoices for a certain date range, subgroup (if applicable), or for a specific invoice using the entry of the invoice ID 638, may be obtained. The invoice search option returns an invoice list 640 including current, historical, and re-billed invoices. Further, the invoice listing may be sorted by pressing on appropriate column heading/labels (e.g. subscriber ID, subgroup ID, group ID) to sort the rows by the data contained in the respective columns.

Invoice presentment transaction functionality also includes an invoice detail function 650. Invoice detail functionality 650 is invoked after a billing entity user selects an invoice ID 608 from the invoice list 604. The invoice detail 650 provides a detailed view of the selected invoice. The invoice detail 650 provides additional information and/or elements including one or more of the following: due date, billing mode, and billing entity address, as well as other elements. The invoice detail may also provide a subscriber listing with the subscriber ID, name, class, and invoice total charges. It should be appreciated that this invoice detail is configurable for desired implementations as part of the invoice presentment software module and transaction functionality.

As one example, the invoice detail screen may include one or more of the following elements: company information, group ID, subgroup ID, invoice ID, create date, due date, invoice period, subscriber ID, subscriber name, class, total, a print voucher, etc.

Also, from the invoice detail 650 a payment voucher 652 may be selected by a billing entity user. For example, a print voucher button/link may be provided on the invoice detail of a current invoice that is being displayed. The payment voucher 652 allows the billing entity user to print the invoice information to be submitted with their payment.

For example, the payment voucher screen may include company name, address, city, state, zip code, invoice ID, due date, invoice period, past-due premium, current premium, total amount due, amount paid, etc. The payment voucher may be customized depending upon the desired implementation.

An invoice summary 654 may also be selected from the invoice detail 650. The invoice summary 654 provides a high-level picture of the selected invoice.

Billing entity users are able to view the invoice summary 654, which is a summary of information for a specific invoice as seen from the invoice detail, by selecting a provided invoice summary button or link. For example, the invoice summary 654 may include company information including one or more of the following: company name; address; city; state; zip code; group ID; subgroup ID; invoice ID; create date; due date; and invoice period. However, it should be appreciated that the invoice summary may be customized and configured dependent upon a desired implementation.

Also, if the billing entity user is an individual subscriber, an individual subscriber contract list 660 may be selected from the invoice detail. For example, a button or link may be provided for individual subscriber billing entities to select the individual subscriber contract list. By selecting the individual subscriber contract list 660, an individual subscriber contract list is provided to the billing entity user (e.g. an individual subscriber). The individual subscriber contract list may include one or more of the following: an invoice ID, a due date, an invoice period, a subscriber name, a subscriber ID, a contract ID, a contract description, as well as other help tools for the individual subscriber. However, it should be appreciated that the individual subscriber contract list may be customized and configured dependent upon a desired implementation.

An individual subscriber contract breakdown 662 may also be selected by a billing entity user pressing a contract description button or link for the respective individual subscriber in the individual subscriber contract list 660. The individual subscriber contract breakdown 660 may be selected from the invoice detail 650, which displays current products in which the individual subscriber is enrolled, additional product details regarding those products, and any retroactive adjustment for that invoice period and for the contract that was selected. The individual subscriber contract breakdown 662 may include one or more of the following: an invoice ID, a due date, an invoice period, a subscriber name, a subscriber ID, a contract ID, a contract description, a plan description for the plan that the specified individual subscriber is enrolled, number of dependents, an amount paid by the plan, a coverage due date for retroactive adjustments to show what adjustments that were applied, a total current amount, a total retroactive amount, a total subscribed premium amount etc. It should be appreciated that the individual subscriber contract breakdown 662 may be configured dependent upon a desired implementation.

An invoice contract list 670 is also selectable from the invoice detail. For example, an invoice contract list link or button may be provided. The invoice contract list 670 displays the contract list for that invoice and totals for each contract.

The invoice contract list 670 may include one or more of the following: the invoice ID, the due date upon which payment is due, the invoice period, the contract ID, a contract description, a contract amount (the total amount for the respective contract), miscellaneous billing items for the invoice including miscellaneous billing item descriptions and a total of miscellaneous fees (including a summation of all miscellaneous fees), billing messages for each invoice, a current bill total (a summation of the total for each contract and miscellaneous fees), an outstanding balance (the current outstanding balance for the billing entity as of this invoice), a total amount due (a summation of the current bill totals and the outstanding balance). It should be appreciated that this is just one example of an invoice contract list and other information/elements may be utilized dependent upon the desired implementation.

Further, a contract breakdown description 672 may be selected by a billing entity user selecting a contract description link or button from the invoice contract list 670. Generally, the contract breakdown 672 displays how the premium/charges are calculated to obtain the totals presented on the invoice screen list. The charges are typically made up of the following primary components: premiums, fees, and discounts. Charge line items are also presented to the billing entity user. This allows the billing entity user to view and maintain benefit information.

For example, the contract breakdown 672 may include one or more of the following elements: invoice information, contract information, premium breakdown information, fee breakdown and discount breakdowns, invoice ID, due date, invoice period, contract ID, contract description, plan ID, subscribers (e.g. the number of subscribers enrolled in each plan), dependents (e.g. the number of dependents enrolled in each plan), amounts (e.g. the amounts per plan), current amounts, retroactive amount, net amount, fee information, discounts, total current amounts, total retroactive amounts, total net amounts, etc.

Moreover, the contract breakdown 672 provides detailed information for selection by subscriber billing entities. For example, a subscriber may select a current subscriber breakdown 674 by selecting a current total link/button from the contract breakdown list 672. The current subscriber breakdown 674 provides detailed information on how the current invoice total was calculated for the subscriber, similar to the individual subscriber contract breakdown 662, previously discussed.

Particularly, the current subscriber breakdown 674 may include elements to aid the subscriber in understanding the current invoice total calculation including one or more of the following elements, such as: invoice ID, due date, invoice period, contract ID, contract description, subscriber ID, subscriber name, plan, product component, dependents, the premium amount per plan, the total amount due per subscriber, the total of current premium amount, etc. Again, the elements may be configured dependent upon a desired implementation.

Additionally, a retroactive subscriber breakdown 676 may also be selectable from the contract breakdown 672 by the subscriber user pressing a retro total button or link from the contract breakdown 672. The retro subscriber breakdown outlines the retroactive activity for the current invoice display. The retroactive subscriber breakdown 676 includes the subscriber information listed by product and coverage dates. Retroactive adjustments premium breakdown provides detailed information on how the retroactive premium was calculated for a subscriber.

Particularly, the retroactive subscriber breakdown 676 may include one or more of the following elements, such as: invoice ID, due date, invoice period, contract ID, contract description, subscriber ID, subscriber name, plan, product component, coverage due date, the amount for the subscriber, the total subscriber amount (the sum of retroactive adjustments for the subscriber), total retroactive adjustments (the sum of all retroactive adjustments), and contract breakdown. The retroactive subscriber 676 may include other elements for display dependent upon the desired implementation.

Lastly, a subscriber user may also select a net subscriber breakdown 678 from the contract breakdown 672 by selecting a net subscriber breakdown button or link. The net subscriber breakdown displays how net premiums and fees are broken down and calculated per subscriber. The charges are made up of two primary components: current premium and retroactive premiums. Particularly, the net subscriber breakdown may include one or more of the following elements, such as: invoice ID, due date, invoice period, contract ID, contract description, subscriber ID, subscriber name, plan, product component, coverage due date, dependents, the amount per plan, a subtotal amount, the total amount due for each subscriber (which is the sum of the current amount and the retro amount), and a total premium which is the total amount due (which is the sum of the amounts for the plan both current and retroactive).

In one embodiment, the previously-described transactions of FIG. 6 related to invoice presentment may be implemented utilizing the invoice presentment software module of the billing module of the on-line integrated health plan system, as previously discussed, to aid the billing entity user in viewing and updating the previously-described information.

Figure 7:
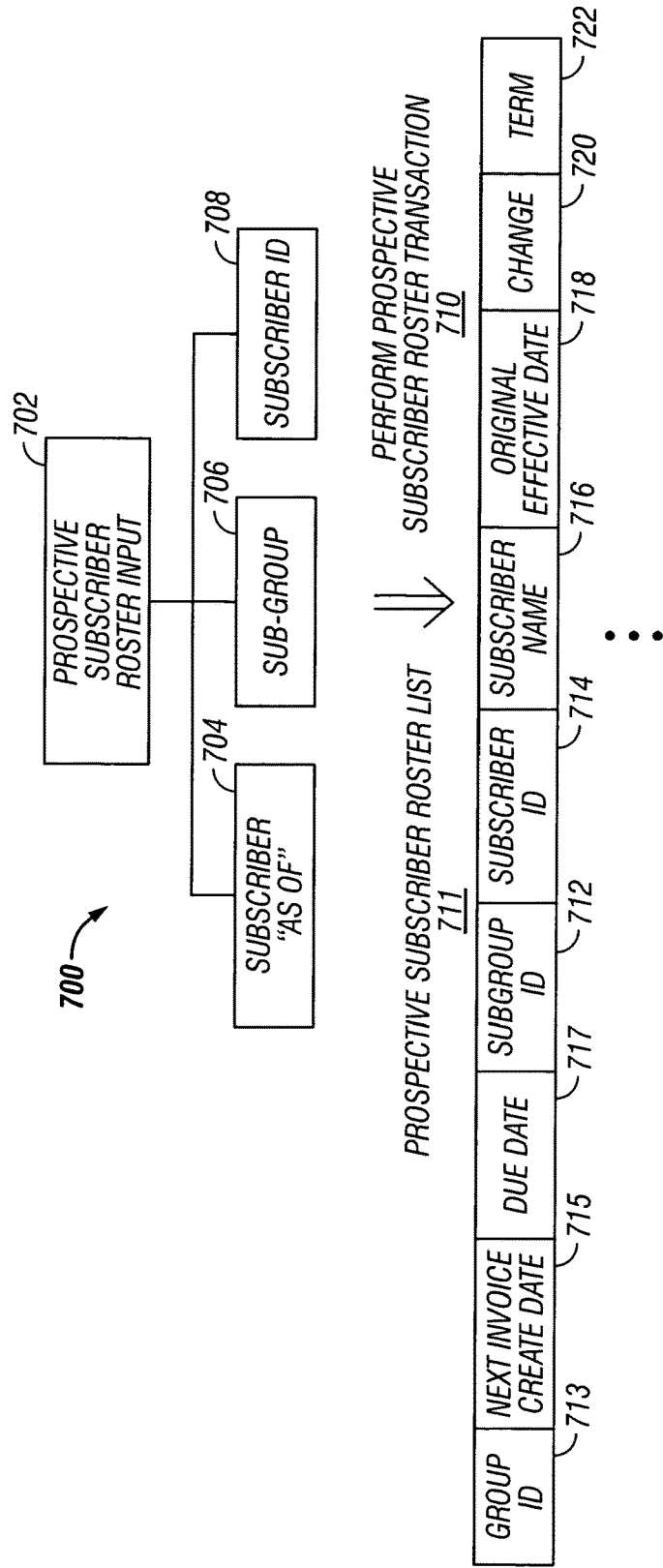
FIG. 7 is a block diagram illustrating a prospective subscriber roster transaction, according to one embodiment of the invention.

Turning now to FIG. 7, FIG. 7 is a block diagram illustrating a prospective subscriber roster transaction, according to one embodiment of the invention. Generally, a prospective subscriber roster transaction 700, allows a user to view a subscriber roster for a specified "as of" date at the logged-in billing entity level. The prospective subscriber roster is only available for group administrators and brokers/agents and not individual user billing entities. Proper logged-in billing entities can view the prospective subscriber roster based on prospective subscriber roster input 702.

Prospective subscriber roster input 702 may include one or more of: a subscriber "as of" date, a subgroup 706, or a subscriber ID 708. The subscriber ("as of") date allows the billing entity user to view the prospective subscriber roster as of a certain date. The subgroup input 706 allows the billing entity user to select and search on a specific subgroup from a list of subgroups associated with the group that it is logged in as. The subscriber ID 708 allows the billing entity user to enter a specific subscriber ID to search on. Based upon one or more of the inputted prospective subscriber input data 702, the prospective subscriber roster module performs a perspective subscriber roster transaction 710 to produce a prospective subscriber roster list 711.

The prospective subscriber roster list 711 outlines information based upon the previously-described input 702. The information displayed in the prospective subscriber roster list 711 lays out information on subscriber attributes for viewing and possibly updating.

Particularly, the prospective subscriber list includes one or more of the following subscriber attributes: group ID 713, the next invoice create date 715, the due date applicable to the next invoice 717, subgroup ID 712, subscriber ID 714, subscriber name 716, the original effective coverage date 718, a change selector 720 to allow the billing entity user to change the prospective roster, and a term selector 722 to allow the billing entity user to term a listed subscriber. Also, the prospective subscriber roster list may also include a button/link to add a subscriber. Further, the prospective subscriber roster list may be configured to display elements and information dependent upon a desired implementation. Also, it should be appreciated, that prior to the display of the prospective subscriber roster list a filter process usually occurs configurable in terms of elements, business rules, and rule dependencies to limit the amount of information presented.

Figure 8:
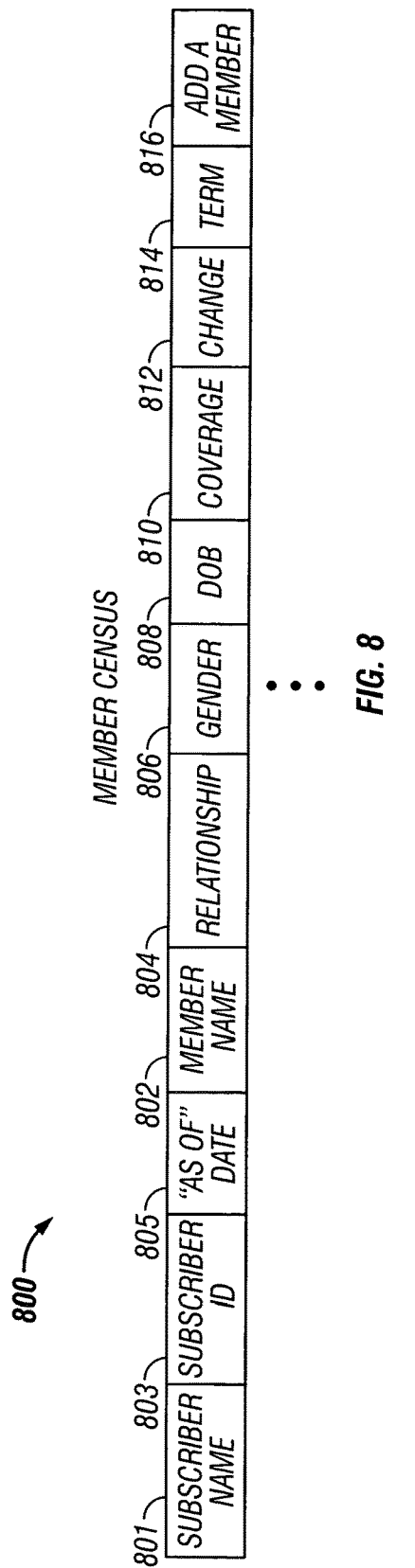
FIG. 8 is a block diagram illustrating a member census, according to one embodiment of the invention.

Further, in one embodiment, when a billing entity user selects a subscriber ID 714 from the prospective subscriber roster list 711 a member census 800 may be provided as shown in FIG. 8. The member census 800 provides a listing of all members per subscriber based upon the previously prospective subscriber roster input data. The member census list 800 may include the following elements: a subscriber name 801, a subscriber ID 803, an "as of" date 805 (to display the as of date for the member census), a member name 802, a relationship 804 (the relationship of the member to the subscriber), gender 806, date of birth 808 (DOB), coverage 810 (coverage information for the respective member), change 812 (a selectable field that allows the billing entity user to make changes to their prospective invoice), term 814 (a selectable field that allows the user to term a member listed on the member census), and add a member 816 (a selectable link that allows the billing entity user to add a new member).

Figure 9:
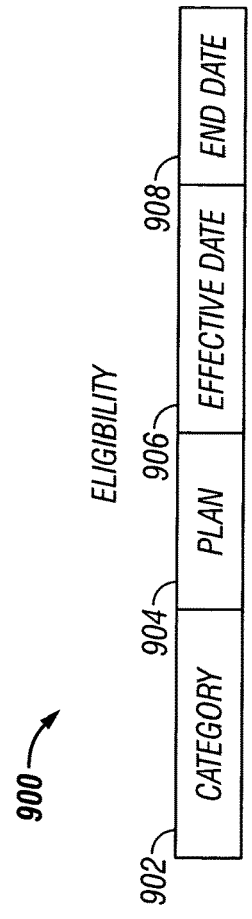
FIG. 9 is a block diagram illustrating an eligibility listing that may be displayed as a result of a billing entity user selecting the original effective date field for a respective member from the prospective subscriber roster, according to one embodiment of the invention.

Turning now to FIG. 9, FIG. 9 is a block diagram illustrating an eligibility listing 900 that may be displayed as a result of a billing entity user selecting the original effective date field for a respective member from the prospective subscriber roster. The eligibility listing 900 includes at least one or more of the following: a category 902 (the category or type of coverage/product), plan 904 (the plan description for the coverage/product), the effective date of the eligibility 906, and the end date of the eligibility 908.

It should be appreciated that in one embodiment the previously-described prospective subscriber roster related transactions may be implemented in conjunction with the prospective subscriber roster module of the billing module of the on-line health plan system such that the billing entity user can view and possibly update the previously-described information.

Figure 10:
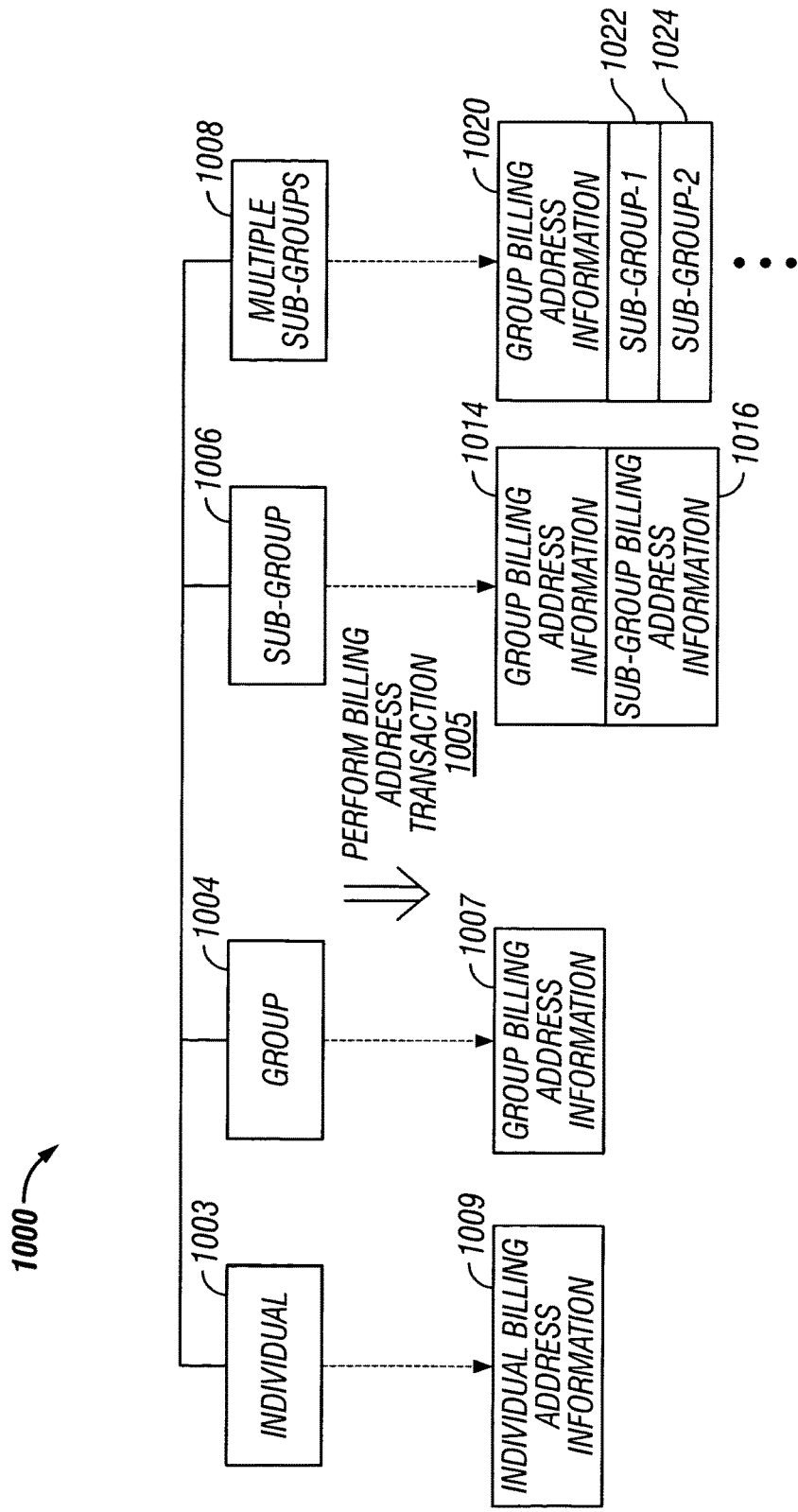
FIG. 10 is a block diagram illustrating a process to acquire billing address information, according to one embodiment of the invention.

With reference now to FIG. 10, FIG. 10 is a block diagram illustrating a process 1000 to acquire billing address information. Particularly, the billing address shows the current group, subgroup, or individual subscriber billing address information and is not useable by brokers/agents. The acquiring of billing information for brokers/agents will be discussed later with reference to FIG. 11.

If the billing entity user is logged in at the individual subscriber level 1003, and also is billed at the individual subscriber level, then the billing module performs a billing address transaction 1005, and the individual subscriber is presented with individual billing address information 1009. This individual billing address information typically includes at least one or more of: a subscriber ID, a subscriber name, the address of the subscriber (e.g. including address lines, city, state, and zip information), phone number, fax number, and email address. Of course this is one example of individual billing address information and this information may be configured dependent upon any desired implementation.

If the billing entity user is logged in at the group level 1004, and also bills at the group level, the billing entity user after the billing module performs the billing address transaction 1005 is presented with group billing address information 1007. In one example this includes one or more of the following: a group ID, a group name, address information (e.g. address lines, city, state, and zip code information), phone number, fax number, and email address. Of course this is one example of billing address information and this information may be configured dependent upon any desired implementation.

If the billing entity user is logged in at a subgroup level 1006, and also bills at the subgroup level, after the billing module performs the billing address transaction 1005, a subgroup billing address screen including group billing address information 1014 and subgroup billing address information 1016 is presented to the billing entity user. This includes group level information as previously discussed as well as subgroup billing address information. In one example, subgroup billing address information 1016 includes one or more of the following: subgroup ID, the subgroup name, address information (e.g. address lines, city, state and zip code), phone number, fax number, and email address. However, in this instance, the group billing address information may be trunctuated to only include the group ID, group name. Also, a status for the subgroup may be presented. Again, this information may be configure dependent upon any desired implementation.

Lastly, if the billing entity user is logged in at the group level, and bills at a subgroup level (and more than one subgroup exists), the billing entity user is considered a multiple subgroup 1008, and after the billing module performs billing address transaction 1005, the billing entity user is displayed group billing address information 1020 including the group ID and group name, and a plurality of selectable subgroups (e.g. subgroup-1 1022, and subgroup-2 1024) each of which include the subgroup ID and the subgroup name. Further, each of these listed subgroups may be selectable by selecting the subgroup ID in which case full subgroup billing address information is presented for the selected subgroup, as previously discussed.

Figure 11:
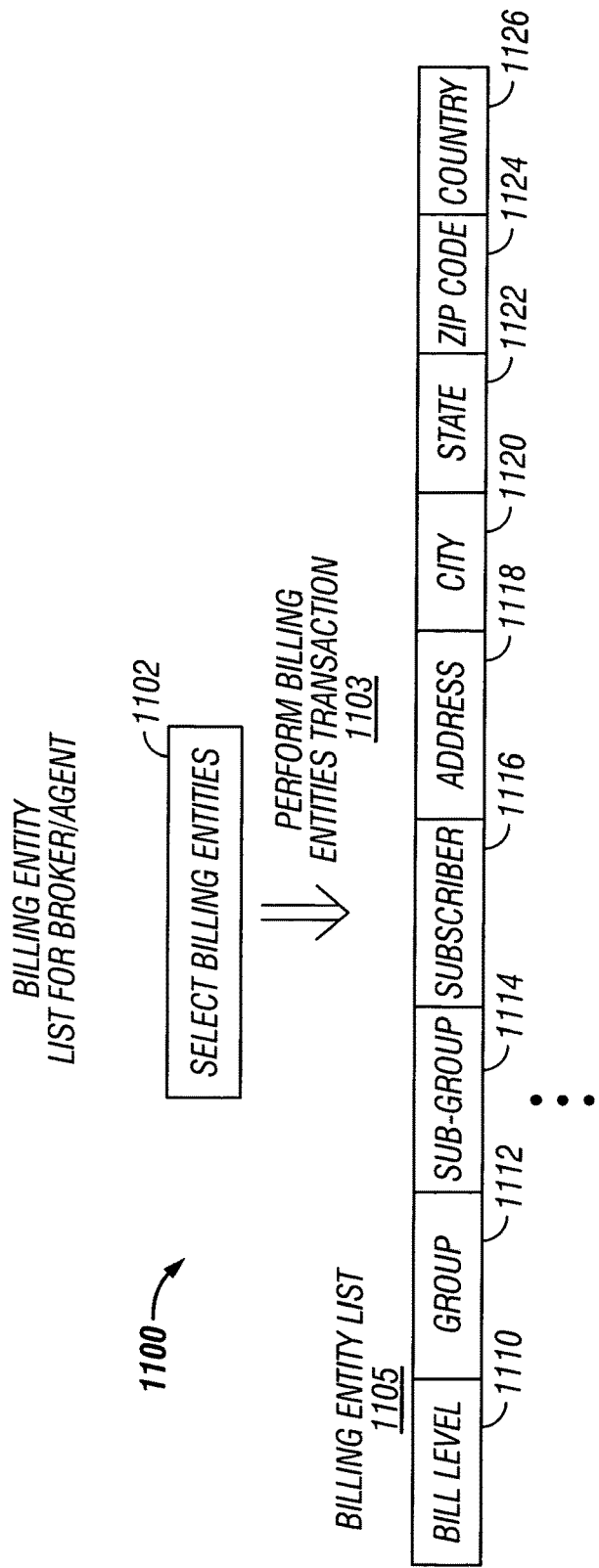
FIG. 11 is a block diagram illustrating a billing entity listing for brokers/agents, according to one embodiment of the invention.

Turning now to FIG. 11, FIG. 11 is a block diagram illustrating a billing entity listing 1100 for brokers/agents, according to one embodiment of the invention. At block 1102, a broker/agent selects the billing entities function (e.g. by selecting a proper link or button or selection from a pull-down menu). The billing module then performs a billing entities transaction 1103. Particularly, a billing entity list 1105 is displayed to the broker/agent to allow the broker/agent to view a listing of the billing entities he or she is actively receiving commissions from and that he or she has a current contract with as of the current date period.

More particularly, in one embodiment, the billing entity list 1105 may include, for example, some or all of the following elements: a bill level 1110 that displays the bill level for each billing entity listed (e.g. group, subgroup, individual, etc.); a group listing 1112 to display the group ID and the group name; a subgroup listing 1114 to display the subgroup ID and the subgroup name for the billing entities that bill at that subgroup level; a subscriber listing 1116 to display the subscriber name in a last, first, middle initial format; an address listing 1118 to display the billing entity's address lines; a city listing 1120 to display the billing entity's city; a state listing 1122 to display the billing entity's state; a zip code listing 1124 to display the billing entity's zip code; and a country listing 1126 to display the billing entity's country. It should be appreciated that different fields or listings may be utilized in the billing entity list 1105 and that it is configurable to implement a desired implementation.

Figure 12:
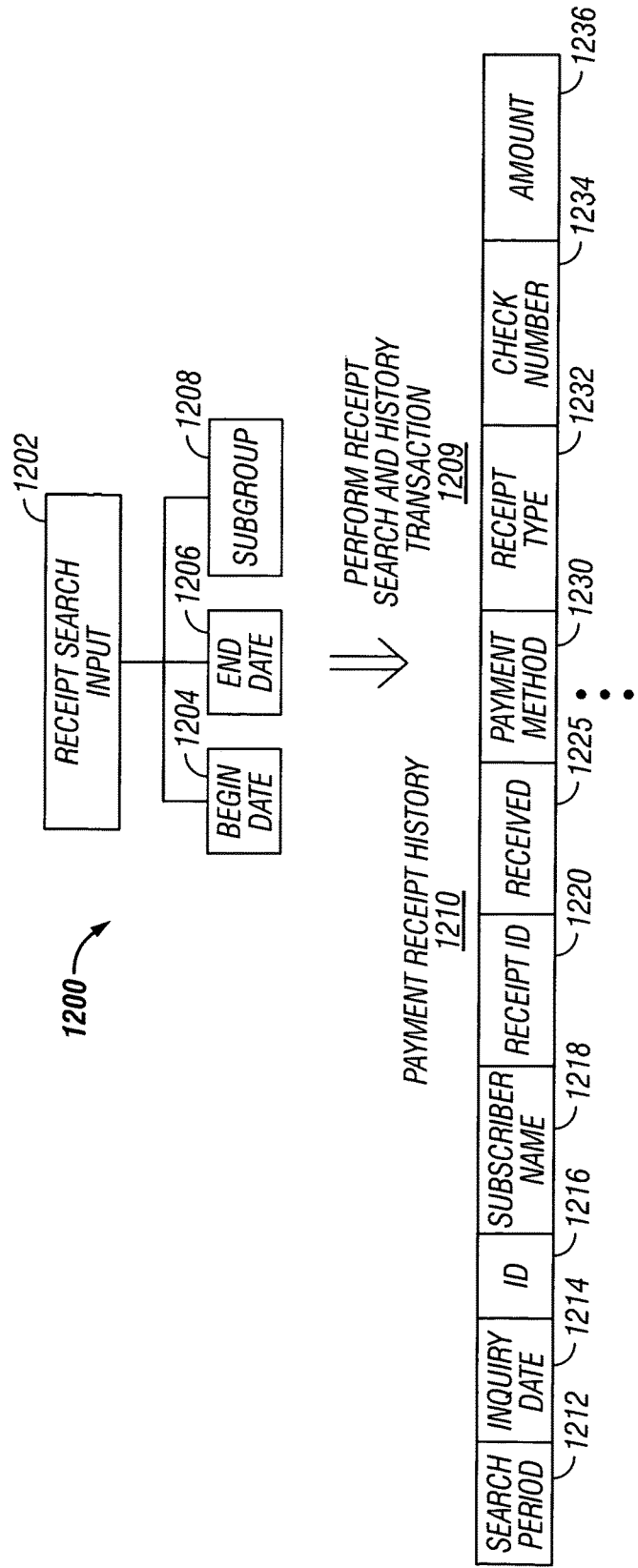
FIG. 12 is a block diagram illustrating a receipt search process, according to one embodiment of the invention.

With reference to FIG. 12, FIG. 12 is a block diagram illustrating a receipt search process 1200, according to one embodiment of the invention. The payment receipt search allows a billing entity user to view payment receipt history information for the billing entity user based upon the receipt search input 1202 that is entered in order to determine a resulting set of receipt history. A payment receipt history search option may be selectable from a link or button or pull-down menu and may be utilized by group administrators at the group or subgroup level, individuals, and by brokers/agents.

As an example, receipt search input 1202 may include one or more of the following: a begin date, an end date, and a subgroup if applicable. Based upon this input, a receipt search and history transaction 1209 is performed by the billing module. As a result of the receipt search and history transaction a payment receipt history listing 1210 is displayed.

The payment receipt history 1210 may include one or more of the following elements: a search period to display the search period (e.g. a "from" and "to" date for the resulting receipt history); an inquiry date 1214 to display the current system date; an ID 1216 to display the ID for which the receipt history search is associated (e.g. a group ID, a subgroup ID, an individual ID, etc.); a subscriber name to display the subscriber name for an individual) (please note that this field only applies when the billing entity level is individual), a receipt ID 1220 to display a receipt ID; a received date 1225 to display the date payment was received; a payment method 1230 to display the payment method for a receipt; a receipt type 1232 to display a description of the type of receipt (e.g. payment, reversal, write-off, write-off reversal, insufficient funds reversal, refund, transfer in, transfer out, etc.); a check number 1234 to display the check number if applicable or a blank if no data is returned for this field; and an amount 1236 to display an amount for the receipt received. It should be appreciated that the payment receipt history may be sortable dependent upon a selected column. Further, it should be appreciated that the receipt history is configurable such that it can be configured for a desired implementation.

It should be appreciated that in one embodiment the previously-described billing address, billing entity, and receipt search related transactions may be implemented in conjunction with the processing and payment module of the billing module of the on-line health plan system such that the billing entity user can view as well as possibly update the previously-described information.

Further, while embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. A non-transitory machine-readable medium having stored thereon instructions, which when executed by a machine of an integrated health plan computer system, cause the machine to perform the following operations comprising:

connecting at least one billing entity user to the integrated health plan computer system, wherein the at least one billing entity user is connected to a different launch page in accordance with a predetermined privilege level afforded to the at least one billing entity user by the integrated health plan computer system, and further wherein the predetermined privilege level and resulting launch page are determined by log-in information provided by the at least one billing entity at an initial display page; and receiving by a billing module of the integrated health plan computer system each of the following on-line billing related transactions from one or more of the at least one billing entity users, wherein the billing module includes a transaction module for performing transactions and an information display module, including a display format module, to display information that complies with a display format that is compatible with the integrated health plan computer system:

an invoice presentment transaction, wherein an invoice presentment module of the billing module of the integrated health plan computer system invokes the information display module and displays results of the invoice presentment transaction performed by the transaction module to the billing entity users, a prospective subscriber roster transaction, including:
generating by the transaction module, by a prospective subscriber roster module of the billing module of the integrated health plan computer, a prospective subscriber roster list using at least one of
(i.) a received "as of" input date,
(ii.) a subgroup and
(iii.) a subscriber ID;
displaying by the information display module and the prospective subscriber roster list to the billing entity user, wherein based upon (i.) the prospective subscriber list includes prospective subscriber names associated with the billing entity user as of the "as of" input date, based upon (ii.) the prospective subscriber list includes prospective names associated with the received subgroup, or based upon (iii.) the prospective subscriber list includes prospective names associated with the received subscriber ID; and a member census transaction generated by the transaction module of the billing module based on the subscriber ID in response to a member census request from the billing entity user, wherein for prospective subscriber roster lists generated using (iii.), no separate step of receiving of a subscriber ID is required and for prospective subscriber roster lists generated using (i.) or (ii.), receiving a subscriber ID in order to generate the member census; and displaying by the information display module the member census to the billing entity user.

2. The non-transitory machine-readable medium of claim 1 wherein the billing entity user includes one of a group administrator and a broker, but not an individual.

3. The non-transitory machine-readable medium of claim 1 wherein performing invoice presentment transactions further includes operations comprising performing a current invoice search for the billing entity user and displaying results of the current invoice search to the billing entity user.

4. The non-transitory machine-readable medium of claim 1 wherein performing invoice presentment transactions further includes operations comprising performing an invoice search based upon input dates and displaying results of the invoice search as an invoice search listing to the billing entity user.

5. The non-transitory machine-readable medium of claim 4 further comprising instructions to perform an invoice detail for an invoice of the invoice search listing, the invoice detail being selectable based upon a selection of an invoice ID for the invoice from the invoice search listing, and to display the invoice detail for selected invoice to the billing entity user.

6. The non-transitory machine-readable medium of claim 5 further comprising instructions to generate and display a payment voucher from the invoice detail for the selected invoice.

7. The non-transitory machine-readable medium of claim 5 further comprising instructions to select an invoice contract list from the invoice detail and to generate and display contract details for the selected invoice.

8. The non-transitory machine-readable medium of claim 1 further comprising instructions to display billing address information for a selected individual, group, or subgroup.

9. The non-transitory machine-readable medium of claim 1 further comprising instructions to, responsive to a receipt search selection by the billing entity user, generate and display a payment receipt history list to the billing entity user, wherein the billing related transactions for the billing entity user includes the receipt search.

10. A method of performing on-line billing related transactions in an integrated health plan computer system, the method comprising:

connecting at least one billing entity user to the integrated health plan computer system wherein the at least one billing entity user is connected to a different launch page in accordance with a predetermined privilege level afforded to the at least one billing entity user by the integrated health plan computer system, and further wherein the predetermined privilege level and resulting launch page are determined by log-in information provided by the at least one billing entity at an initial display page; and receiving by a billing module of the integrated health plan computer system each of the following on-line billing related transactions from one or more of the at least one billing entity users, wherein the billing module includes a transaction module for performing transactions and an information display module, including a display format module, to display information that complies with a display format that is compatible with the integrated health plan computer system:
an invoice presentment transaction, wherein an invoice presentment module of the billing module of the integrated health plan computer system invokes the information display module and displays results of the invoice presentment transaction performed by the transaction module to the billing entity users,
a prospective subscriber roster transaction, including:
generating by the transaction module a prospective subscriber roster module of the billing module of the integrated health plan computer, a prospective subscriber roster list using at least one of
(i.) a received "as of" input date,
(ii.) a subgroup and
(iii.) a subscriber ID;
displaying by the information display module the prospective subscriber roster list to the billing entity user, wherein based upon (i.) the prospective subscriber list includes prospective subscriber names associated with the billing entity user as of the "as of" input date, based upon (ii.) the prospective subscriber list includes prospective names associated with the received subgroup, or based upon (iii.) the prospective subscriber list includes prospective names associated with the received subscriber ID; and
a member census transaction generated by the transaction module of the billing module based on the subscriber ID in response to a member census request from the billing entity user, wherein for prospective subscriber roster lists generated using (iii.), no separate step of receiving of a subscriber ID is required and for prospective subscriber roster lists generated using (i.) or (ii.), receiving a subscriber ID in order to generate the member census; and
displaying by the information display module the member census to the billing entity user.

11. The method of claim 10 wherein a billing entity user includes one of a group administrator and a broker, but not an individual.

12. The method of claim 10 wherein performing invoice presentment transactions further includes performing a current invoice search for a billing entity user and displaying results of the current invoice search to the billing entity user.

13. The method of claim 10 wherein performing invoice presentment transactions further includes performing an invoice search based upon input dates and displaying results of the invoice search as an invoice search listing to the billing entity user.

14. The method of claim 13 further comprising performing an invoice detail for an invoice of the invoice search listing, the invoice detail being selectable based upon a selection of an invoice ID for the invoice from the invoice search listing, and displaying the invoice detail for the selected invoice to the billing entity user.

15. The method of claim 14 further comprising generating and displaying a payment voucher from the invoice detail for the selected invoice.

16. The method of claim 14 further comprising selecting an invoice contract list from the invoice detail and generating and displaying contract details for the selected invoice.

17. The method of claim 10 further comprising displaying billing address information for a selected individual, group, or subgroup.

18. The method of claim 10 further comprising, responsive to a receipt search selection by the billing entity user, generating and displaying a payment receipt history list to the billing entity user, wherein the billing related transactions for the billing entity user includes the receipt search.

* * * * *